United States Patent
Hyde et al.

(10) Patent No.: US 9,471,816 B1
(45) Date of Patent: Oct. 18, 2016

(54) INCREASING DYNAMIC RANGE OF RFID TAG SELF-TUNING

(71) Applicant: Impinj, Inc., Seattle, WA (US)

(72) Inventors: John Hyde, Corvallis, OR (US); Theron Stanford, Seattle, WA (US); Harley Heinrich, Snohomish, WA (US); Omer Onen, Redmond, WA (US); Charles Peach, Kirkland, WA (US)

(73) Assignee: IMPINJ, INC., Seattle, WA (US)

( * ) Notice: Subject to any disclaimer, the term of this patent is extended or adjusted under 35 U.S.C. 154(b) by 0 days.

(21) Appl. No.: 14/711,717

(22) Filed: May 13, 2015

Related U.S. Application Data (60) Provisional application No. 61/993,889, filed on May 15, 2014.

(51) Int. Cl.
| | | |
|---|---|---|
| *G06K 7/10* | (2006.01) | |
| *G06K 19/07* | (2006.01) | |
| *G06K 19/077* | (2006.01) | |

(52) U.S. Cl.
CPC ....... *G06K 7/10158* (2013.01); *G06K 7/10297* (2013.01); *G06K 19/07754* (2013.01); *G06K 19/07773* (2013.01); *G06K 19/0723* (2013.01)

(58) Field of Classification Search
CPC .................. G06K 19/07773; G06K 19/07754; G06K 19/073; G06K 19/07756; G06K 19/07745; G06K 19/0775; G06K 7/10297; G06K 7/10158; G06K 19/0723
USPC ......... 340/10.5, 10.34, 10.1, 10.6, 334, 572; 235/492, 488; 438/26
See application file for complete search history.

(56) References Cited

U.S. PATENT DOCUMENTS

| | | | |
|---|---|---|---|
| 8,952,792 B1* | 2/2015 | Srinivas ............... | H01Q 1/2208 340/10.1 |
| 2014/0070010 A1* | 3/2014 | Diorio .............. | G06K 19/07773 235/492 |
| 2014/0073071 A1* | 3/2014 | Diorio ................ | G06K 19/0723 438/26 |
| 2014/0144992 A1* | 5/2014 | Diorio ................ | G06K 7/10297 235/488 |
| 2015/0227832 A1* | 8/2015 | Diorio .............. | G06K 19/07745 235/492 |

* cited by examiner

*Primary Examiner* — Ali Neyzari
(74) *Attorney, Agent, or Firm* — Turk IP Law, LLC (57) ABSTRACT

An RFID tag tuning circuit is capable of tuning the impedance matching between an RFID integrated circuit (IC) and an antenna on an RFID tag to increase the amount of power that the IC can extract from an incident RF wave. The tuning circuit tunes the impedance matching by adjusting a variable impedance coupling the antenna and the IC. Prior to tuning, the variable impedance is set using a voltage output from a tuning switch stage of an IC rectifier.

21 Claims, 8 Drawing Sheets

SIGNAL PATH DURING R→T

FIG. 5A

SIGNAL PATH DURING T→R

INCREASING DYNAMIC RANGE OF RFID TAG SELF-TUNING

CROSS REFERENCE TO RELATED APPLICATIONS

This application claims benefit under 35 U.S.C §119(e) of U.S. Provisional Application Ser. No. 61/993,889 filed on May 15, 2014. The disclosures of the aforementioned provisional application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag tuning circuit capable of tuning the impedance matching between an RFID integrated circuit (IC) and an antenna on an RFID tag to increase the amount of power that the IC can extract from an incident RF wave. The tuning circuit tunes the impedance matching by adjusting a variable impedance coupling the antenna and the IC. Prior to tuning, the variable impedance is set using a voltage output from a tuning switch stage of an IC rectifier.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
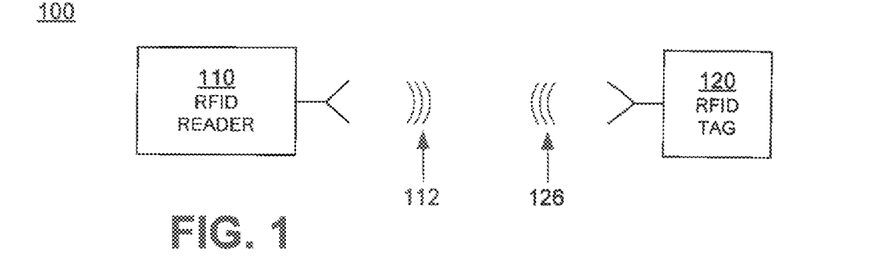
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
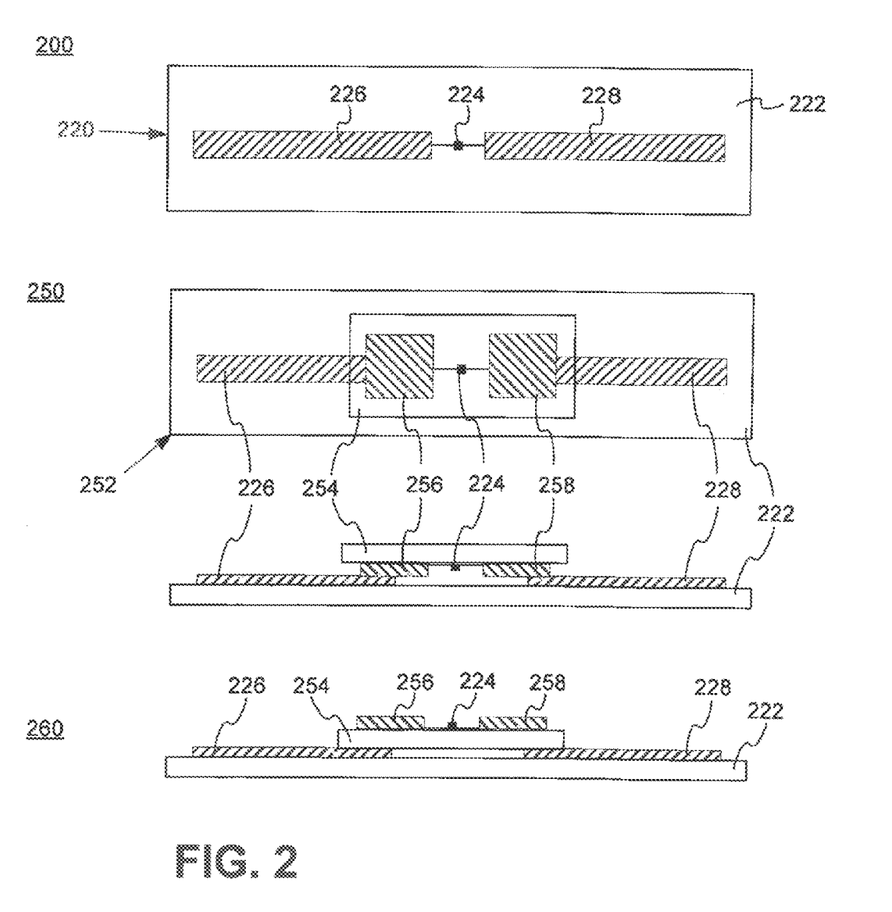
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
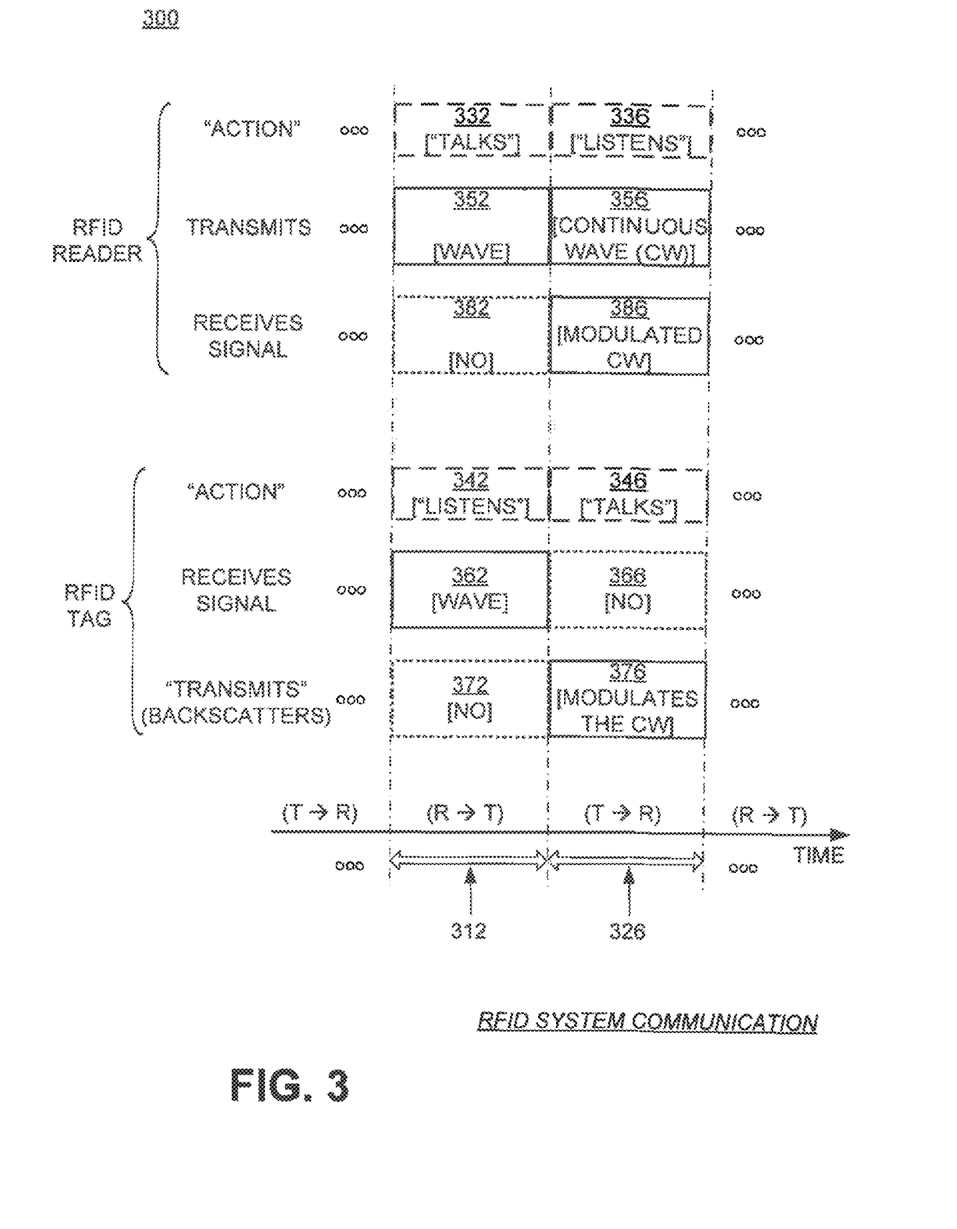
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
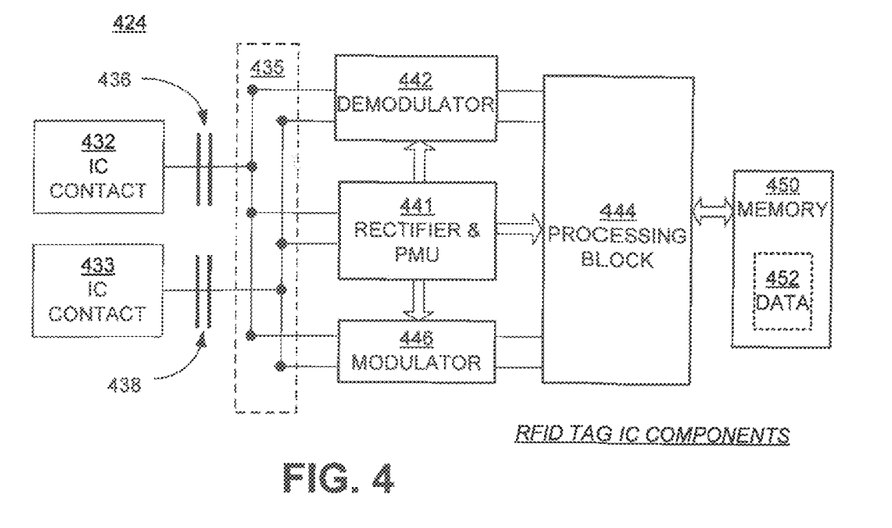
FIG. 4 is a block diagram showing a detail of an RFID integrated circuit (IC).

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432 and 433, suitable for coupling to antenna segments such as antenna segments 226/228 of RFID tag 220 of FIG. 2. When two IC contacts form the signal input from and signal return to an antenna they are often referred-to as an antenna port. IC contacts 432 and 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432 and 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432 and 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
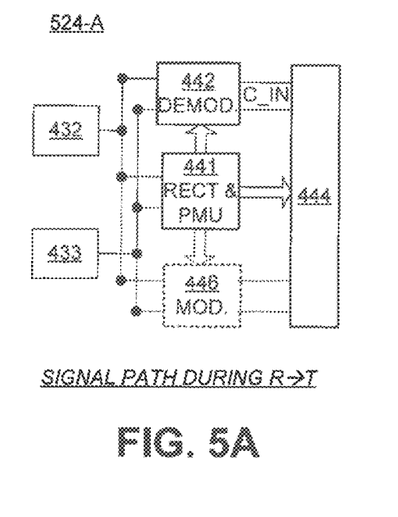
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432 and 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
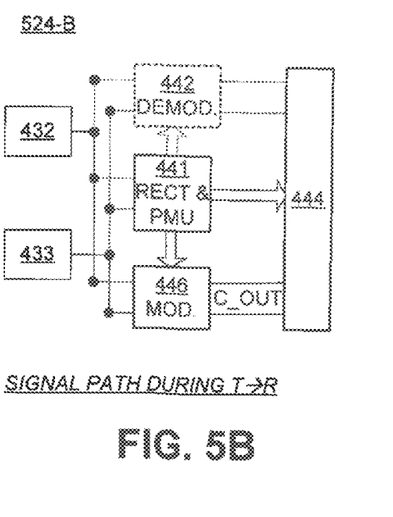

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432 and 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Passive RFID tags rely on energy extracted from an RF wave to power the tag IC. In general, the efficiency of the RF power transfer from an RFID reader to a passive tag's IC directly affects the operational range of the RFID system. Accordingly, an RFID tag may include a matching network coupled between the IC and the antenna for matching the antenna impedance to the IC input impedance, thereby maximize power transfer to the IC. This matching network may employ discrete elements such as capacitors or inductors, or may be formed by the design of the antenna itself, and may be part of the antenna, part of the IC, part of both, or a standalone component. To ensure that as much of the RF power incident on the antenna is transferred to the IC, the source (antenna) impedance should be the complex conjugate of the load (IC) impedance. In some situations, antenna impedance may vary with environmental conditions such as humidity, substrate material, dielectric materials near the tag, etc. Similarly, IC impedance may vary with the processing of the IC itself. A matching network that matches antenna and IC impedances for one tag and one frequency under one condition may not match antenna and IC impedances for another IC at another frequency under a different condition. When the impedances vary the matching between the antenna and IC degrades, tag sensitivity degrades, and the operational range of the RFID system may be reduced.

Figure 6:
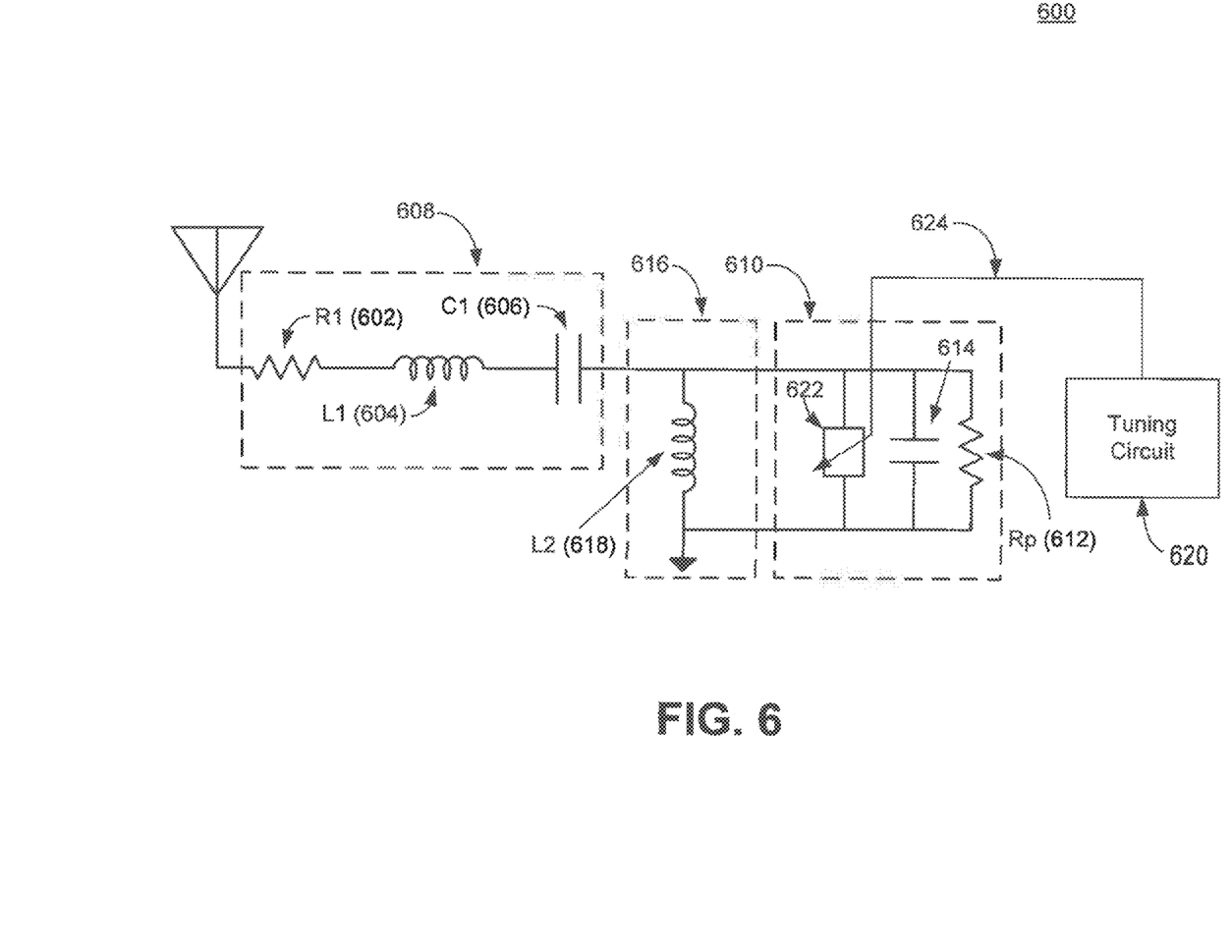
FIG. 6 depicts an RFID tag front-end equivalent circuit including a tuning circuit.

FIG. 6 is a diagram of an RFID tag front-end equivalent circuit 600 including a tuning circuit 620. RFID tag front-end equivalent 600 models the various impedances of an RFID tag and includes antenna section 608, IC input section 610, and matching network 616 that couples antenna section 608 to IC input section 610. Antenna section 608 includes inductor L1 604 and capacitor C1 606, which model the reactive portion of the antenna impedance, and resistor R1 602, which models the real portion of the antenna impedance. IC input section 610 includes a resistor Rp 612 that models the input resistance of the IC, a capacitor Cp 614 that models the input reactance of the IC, and a tuning element 622 coupled to tuning circuit 620 via tuning control interface 624. Tuning circuit 620 and/or tuning control interface 624 may be part of the IC and/or external to the IC. Matching network 616 includes inductor L2 618 that models the inductance of matching network 616.

To maximize power transfer between the antenna and IC in equivalent circuit 600, the reactance of inductor L1 604 should be the complex conjugate of the reactance of capacitor C1 606, and the reactance of inductor L2 618 should be the complex conjugate of the reactance of IC input section 610. In this "matching" situation the equivalent circuit 600 reduces to the resistors R1 602 and Rp 612 in series.

Typical matching networks use components with static values, and therefore can only maximize power transfer and extraction for particular values of antenna and IC impedance. However, antenna and IC impedance values can vary greatly. For example, RFID tags often operate over a range of frequencies. Because antenna and IC impedances vary as a function of frequency, a matching network that is configured for maximum power transfer at one frequency may not maximize power transfer at a different frequency.

Other factors may also cause impedance variations and degrade power transfer. Statistical variations in component values during manufacturing may cause the actual antenna and IC impedances to differ from their designed values. Similarly, the environment in which the tag operates (e.g., operating medium such as air, water, etc., or environmental conditions such as temperature, humidity, time, pressure, etc.) or the dielectric properties of an item to which the tag is attached may alter the effective antenna impedance. Consequently, designing a matching network with static-valued components involves design compromises that typically provide good power-conversion efficiency in some circumstances but lower efficiency in other circumstances.

In contrast, the impedance of tuning element 622 in circuit 600 can be adjusted using tuning circuit 620 (via tuning control interface 624). If there is an impedance mismatch between antenna 608 and IC 610 then tuning circuit 620 can adjust or tune tuning element 622 to compensate. In some embodiments, tuning circuit 620 may tune the tuning element 622 by determining peak voltages or extracted power for different impedance settings of tuning element 622, comparing the measurements to determine the impedance setting corresponding to the highest peak voltage or extracted power, then setting tuning element 622 based on the determined impedance setting. In other embodiments, instead of determining the impedance setting corresponding to the highest peak voltage or extracted power, tuning circuit 620 may determine the impedance setting corresponding to a peak voltage or extracted power at least sufficient to power IC 610.

Tuning circuit 620 in circuit 600 can be a standalone circuit or it can be integrated into an IC circuit block, such as one of the blocks in IC 424 of FIG. 4. In some embodiments, tuning circuit 620 may include a peak identifier module for identifying peak voltages for different impedance values of tuning element 622, an accumulator bank for storing temporary tuning information, such as peak voltages and associated impedance settings for tuning element 622, and/or a controller for receiving inputs and providing control signals to tuning element 622, the peak identifier module, and/or the accumulator bank.

Tuning element 622 may be implemented as a continuously variable element (e.g., a resistor, capacitor, or inductor) or as one or more switched elements (e.g., resistors, capacitors, and/or inductors). Of course, tuning element 622 can include one or more variable capacitor(s), variable inductor(s), variable-length transmission line(s), variable resistors, etc. Any of these elements can be continuously variable or discretely variable (i.e. switched). For example, tuning element 622 may include one or more switched capacitors, switched inductors, switched transmission lines, and/or switched resistors. In some embodiments, tuning element 622 may only provide resistive components (i.e., no capacitors, inductors, or transmission lines). In one embodiment tuning element 622 may be an array of two or more switchable capacitors, at least two of which differ in capacitance, which is adjusted by tuning circuit 620. For example, tuning element 622 may include four switchable capacitors, two having a first capacitance and the other two having a second capacitance, or each having different capacitances.

In some embodiments, tuning circuit 620 is operable at an RF power level lower than that needed to operate the rest of the tag IC. For example, suppose that an RFID tag without tuning circuit 620 receives incident RF power sufficient to power the tag IC, but suffers from an impedance mismatch between the antenna and the IC such that the antenna does not transfer enough power to the IC to enable operation. In this case the incident RF field must be increased to enable IC to operate. Now suppose that the tag is equipped with tuning element 622 and with tuning circuit 620. Further suppose that tuning circuit 620 is able to operate at an incident RF power level below the threshold for IC operation. In this case the tuning circuit can power-up and adjust tuning element 622 to reduce the impedance mismatch and improve power transfer between the antenna and the IC, thereby allowing the IC to extract enough power from the incident RF wave to operate.

Figure 7:
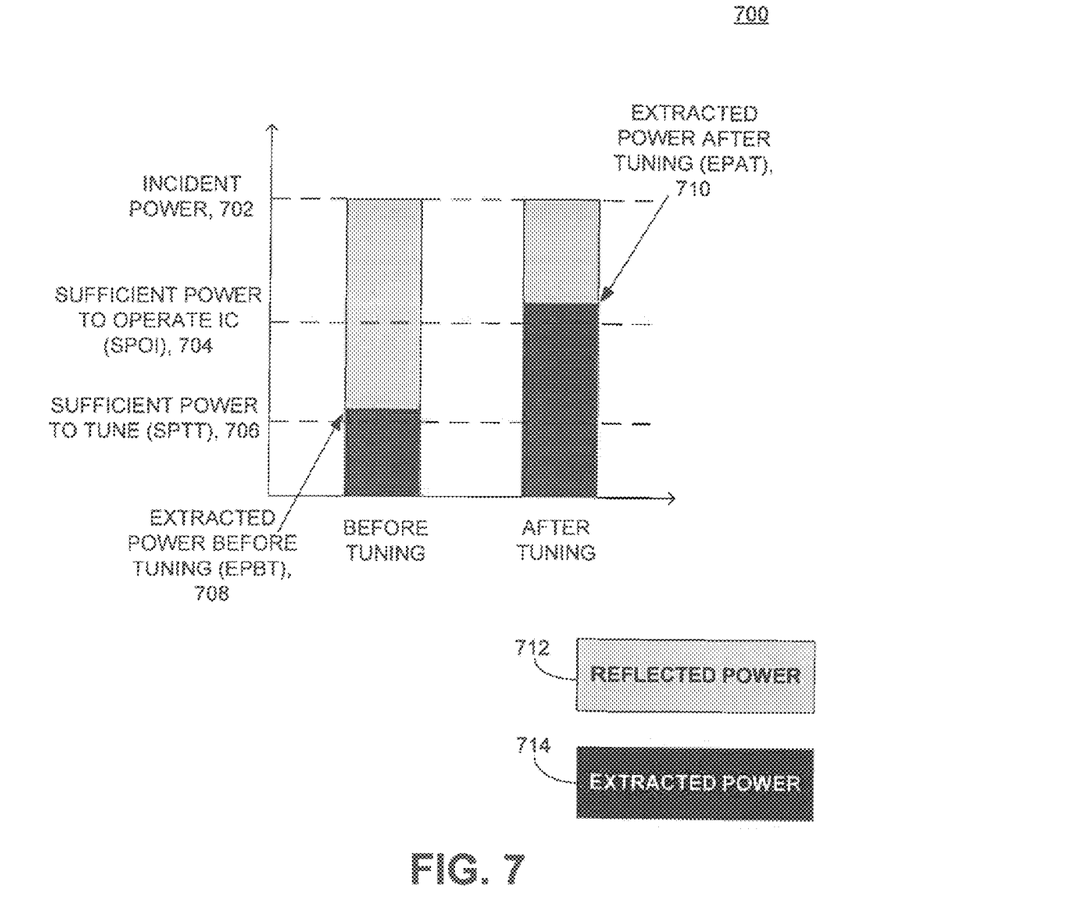
FIG. 7 illustrates the amount of power extracted and lost before and after tuning according to embodiments.

FIG. 7 is a chart 700 depicting power extracted (represented by black, 714) by an RFID IC and power lost (represented by gray, 712) by the IC during a tag tuning process. Power may be lost via reflection due to an impedance mismatch or due to resistive losses within the antenna, matching network, and/or IC. The vertical axis of chart 700 measures power and the horizontal axis shows two time periods: before the tuning process (left) and after the tuning process (right).

The RF power incident on the tag is the same for both time periods, as shown by incident power indicator 702. The IC may require a minimum amount of extracted power to fully operate, as indicated by the "sufficient power to operate IC" (or SPOI) requirement 704. The IC may fully operate when it has sufficient power to enable substantially all of its components to operate, or when it has sufficient power to receive and respond to reader commands according to a communication protocol such as the Gen2 protocol. The tuning circuit (e.g., tuning circuit 620), on the other hand, may require a different, smaller amount of extracted power to operate, as indicated by the "sufficient power to tune" (or SPTT) requirement 706. Before tuning, much of the incident power is reflected and lost (represented by gray). As a result, the extracted power before tuning (EPBT) 708, representing the power extracted by the IC before the tuning circuit operates, may be insufficient to meet SPOI requirement 704, and the IC may not have sufficient power to fully operate. However, the EPBT 708 is sufficient to meet the SPTT requirement 706, and the tuning circuit may have sufficient power to operate.

During operation, the tuning circuit may adjust a variable impedance (e.g., variable impedance 622) to improve impedance matching between the antenna and the IC, thereby increasing the efficiency of the power extraction process (defined as the ratio of power extracted to total incident power) and improving the power transfer between the antenna and IC. For example, as described above, the tuning circuit may measure peak voltages or extracted power for different impedance settings of the variable impedance, compare measurements to determine impedance settings corresponding to the highest peak voltage/extracted power or a peak voltage/extracted power sufficient to meet SPOI requirement 704, and then use the determined impedance setting(s) to set the variable impedance. As a result of the increased power extraction efficiency, the extracted power after tuning (EPAT) 710, representing the power extracted by the IC after the tuning circuit operates, is larger than EPBT 708, and is at least equal to the SPOI requirement 704. Accordingly the IC may have sufficient power to fully operate even though the incident power 702 remains unchanged.

In some embodiments, tuning circuit 620 is configured to adjust tuning element 622 to have an impedance value near the center of its tuning range (that is, the range encompassing the potential impedance values of tuning element 622) before beginning the tuning process. This may increase the dynamic range available for the tuning process, because the impedance of tuning element 622 can be adjusted either upward or downward. As a result, the likelihood that the tuning process will succeed may be increased.

As described above, in some embodiments tuning element 622 is discretely variable, and may include one or more switched impedance elements, such as switched capacitors, switched inductors, switched transmission lines, and/or switched resistors. In these situations the impedance of tuning element 622 may be adjusted by switching (i.e., opening and/or closing associated switches) the impedance elements into or out of the tuning element 622. For example, a switch such as a transistor may couple an impedance element to other impedance elements in the tuning element 622. The impedance element may be "switched into" tuning element 622 by closing the switch. When the switch is closed, the impedance element is electrically coupled to the other impedance elements in the tuning element 622 and contributes its impedance to the overall impedance of tuning element 622. The impedance element may also be "switched out of" tuning element 622 by opening the switch. When the switch is opened, the impedance element is electrically isolated from other impedance elements in the tuning element 622 and does not contribute its impedance to the overall impedance of tuning element 622.

Figure 8:
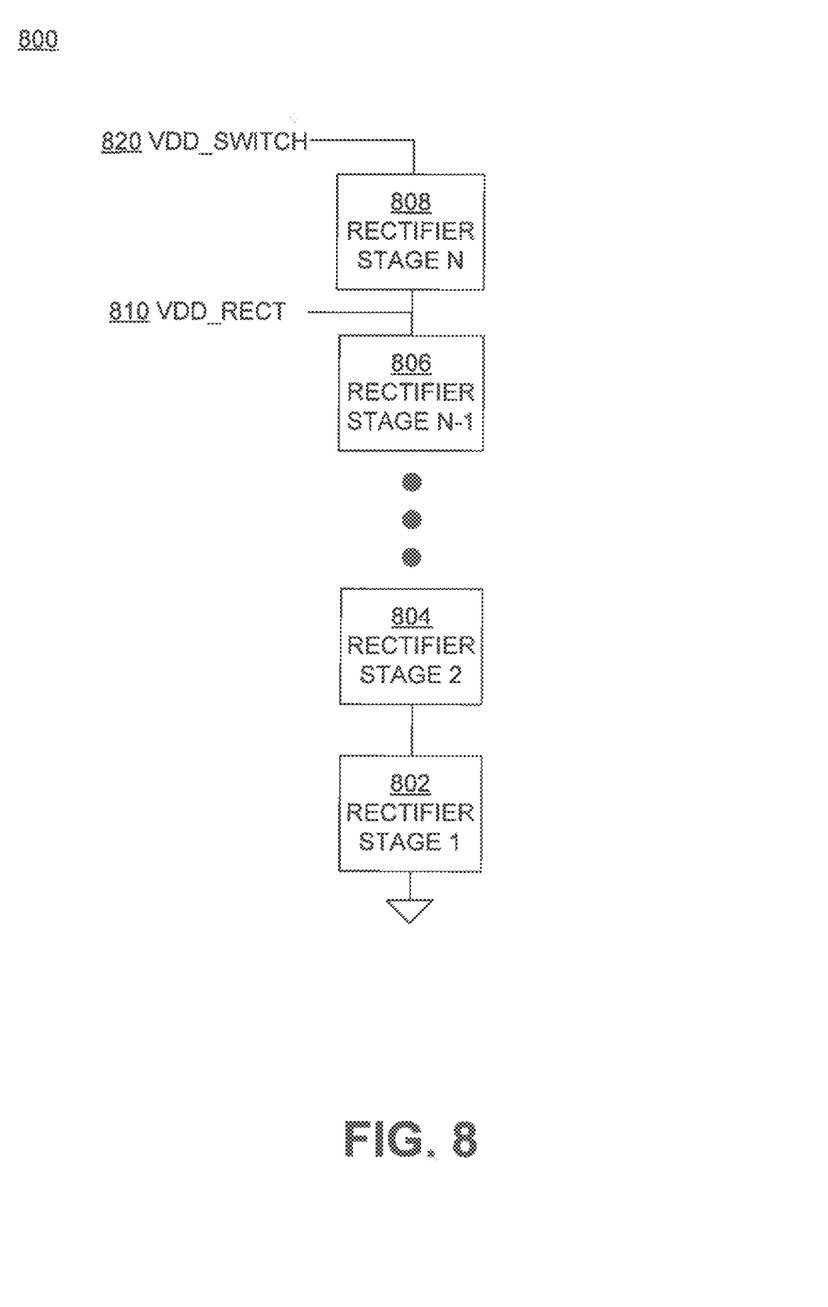
FIG. 8 depicts a multi-stage rectifier with a tuning switch stage configured to provide a voltage output for use in setting the initial value of a tuning element in an RFID tag.

Switching impedance elements into and out of tuning element 622 may consume power, and it may be desirable to keep power consumption during any pre-tuning adjustment of tuning element 622 relatively low so that sufficient power remains for the actual tuning process. To keep switching power consumption low, a relatively high-voltage and low-current voltage supply may be used for switching, because switch actuation may not require significant currents. FIG. 8 depicts a multi-stage rectifier 800 with a tuning switch stage configured to provide a voltage output for use in setting the initial value of a tuning element in an RFID tag. Rectifier 800 has multiple rectifier stages 802, 804, 806, and 808 connected together in series, with larger output voltages available (for a given current) at the outputs of successive rectifier stages. For example, voltage 820 (VDD_SWITCH) provided by the output of rectifier stage 808 may be larger than voltage 810 (VDD_RECT) provided by the output of rectifier stage 806. In some embodiments, each rectifier stage may provide an output voltage between 100 millivolts and 500 millivolts higher than the output voltage of the previous rectifier stage, depending on the stage load. While in the depicted embodiment voltage 810 and voltage 820 are separated by one rectifier stage (stage 808), in other embodiments voltage 810 and voltage 820 may be separated by two or more rectifier stages.

In rectifier 800, voltage 820 (VDD_SWITCH) output by rectifier stage 808 may be used to supply power for the pre-tuning adjustment of tuning element 622 described above, while voltage 810 (VDD_RECT) output by rectifier stage 806 may be used to power other circuits associated with the IC (e.g., tuning circuit 620). In some embodiments, the output(s) of rectifier 800, such as the output of rectifier stage 806 (and the voltage 810), may be decoupled from other circuits such as the tuning circuit 620 during the pre-tuning adjustment of tuning element 622. For example, tuning circuit 620 may disabled by preventing it from drawing power from rectifier stage 806 during the pre-tuning adjustment of tuning element 622. This may prevent a reduction in output voltage 820 due to power consumption by tuning circuit 620 during the pre-tuning adjustment of tuning element 622. Subsequently, tuning circuit 620 may be enabled by allowing it to draw power from the rectifier 800.

Figure 9:
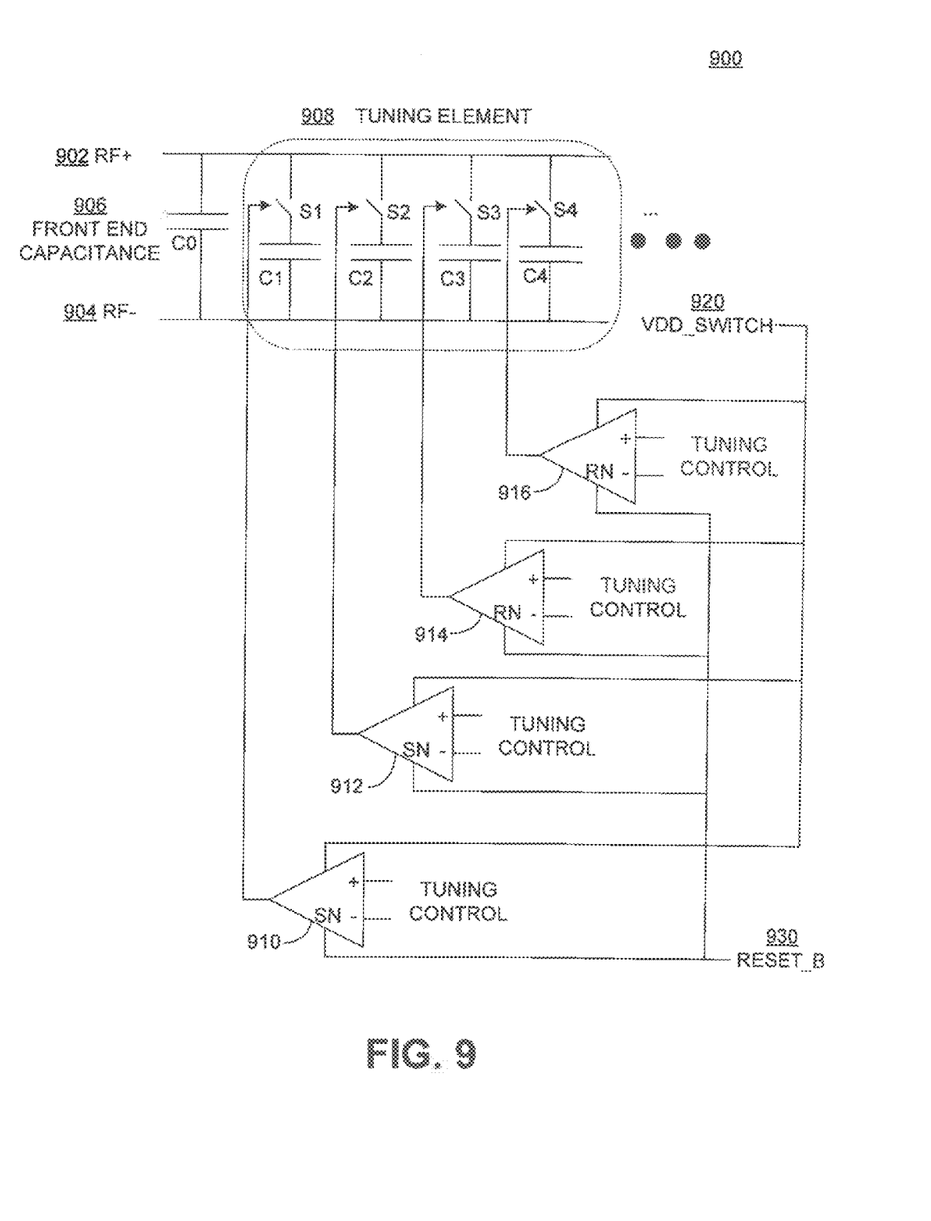
FIG. 9 is a simplified diagram of an RFID tag front end illustrating how a tuning element can be adjusted.

FIG. 9 is a simplified diagram 900 of an RFID tag front end illustrating how a tuning element can be adjusted. Diagram 900 depicts an RFID IC input portion having an RF+ input 902 and an RF− input 904. The IC input portion also includes a front end capacitance 906 (similar to capacitor Cp 614 modeling the input reactance of the IC) and a tuning element 908 (similar to tuning element 622), both arranged in parallel and coupled between the inputs 902 and 904. Tuning element 908 includes a number of different capacitors C1, C2, C3, and C4 arranged in parallel. Switches S1, S2, S3, and S4 allow the capacitors to be switched into or out of the overall tuning element 908, thereby modifying the effective impedance of the tuning element 908.

Each of switches S1-S4 is controlled by a corresponding level shifter 910-916, which are used to connect circuitry at different voltage or logic levels. Each of the level shifters 910-916 are connected to voltage 920 (VDD_SWITCH, similar to voltage 820), voltage 930 (RESET_B), and tuning control inputs from a tuning circuit such as tuning circuit 620, and can output a "high" signal having a voltage similar to voltage 920 or a "low" signal substantially at ground.

While "high" and "low" signals in the context of the outputs of level shifters 910-916 refer to signals having a voltage similar to voltage 920 and signals substantially at ground, respectively, in general "high" and "low" in this disclosure refer to any two differing states of a signal, parameter, or component. For example, a switch such as one of the switches S1-S4 may be in a "high" or "low" state, where the "high" and "low" states correspond to a closed or open switch state, or vice versa. As another example, a signal may be "high" if it has a first value and "low" if it has a second value less than the first value. As yet another example, a voltage may be "high" if it has a value substantially different from a reference potential (e.g., ground) and "low" if it has a value substantially similar to the reference potential.

In some embodiments, level shifters 910-916 are configured to ignore (i.e., not respond to) the tuning control inputs in a first state and respond to the tuning control inputs in a second state. In the first state, level shifters 910-916 may further be configured to each output a default or startup value, which allows tuning element 908 to have an initial impedance value before the tuning circuit begins tuning.

In one embodiment, in the first state voltage 920 may be high (e.g., have a value substantially different from a reference potential such as ground) and voltage 930 may be low (e.g., have a value substantially similar to the reference potential), and the level shifters 910-916 may ignore control signals on the tuning control inputs (e.g., from the tuning circuit) and may instead each output a default or startup value. For example, level shifters 910-912 are labeled as "SN", indicating that they are set to output a high default value. Level shifters 914-916 are labeled as "RN", indicating that they are set to output a low default value. Since the level shifter outputs control the states of switches S1-S4, in the first state when voltage 930 is low, switches S1 and S2 may be closed due to the high default values output by level shifters 910-912 and switches S3 and S4 may be open due to the low default values output by level shifters 914-916. As a result, capacitors C1 and C2 (coupled to switches S1 and S2) are switched into tuning element 908 and capacitors C3 and C4 (coupled to switches S3 and S4) are switched out of tuning element 908. Accordingly, in the first state tuning element 908 has an initial impedance value derived from the parallel combination of capacitors C1 and C2.

In the second state, voltage 920 may remain high. However, voltage 930 may also be set high, by the tuning circuit or some other portion of the IC. In response, level shifters 910-916 may be configured to adjust their outputs between high and low in response to control signals received via the tuning control inputs. Accordingly, in the second state the tuning circuit may be able to adjust the outputs of level shifters 910-916 to control switches S1-S4, thereby adjusting the impedance of tuning element 908.

In some embodiments, a component of the IC, such as an IC rectifier or the tuning circuit, may place level shifters 910-916 into the first state during a first time period before tuning begins and may subsequently, in a second time period once tuning has begun, place level shifters 910-916 into the second state. For example, the IC component may, upon determining that EPBT is below SPOI but at or above SPTT, place level shifters 910-916 into the first state by setting voltage 920 to high and setting voltage 930 to low. Subsequently, upon beginning the tuning process the IC component may set voltage 930 to high, and level shifters 910-914 (and switches S1-S4) may then become responsive to control signals on the tuning control inputs from the tuning circuit.

As described above, in the first state the initial impedance of tuning element 908 may depend on how level shifters 910-916 are set. In some embodiments, when tuning element 908 is to have a particular, predefined initial impedance, the individual level shifters may be set based on the predefined initial impedance. For example, while in the above description two level shifters are set to "SN" and the other two level shifters are set to "RN" to provide tuning element 908 with a first predefined initial impedance, in other embodiments one level shifter may be set to "SN" and the other three may be set to "RN" to provide tuning element 908 with a second predefined initial impedance. The level shifters may be set at IC manufacture, at tag manufacture, at tag deployment, or may be dynamically set and adjusted during tag operation.

While in FIG. 9 tuning element 908 having capacitors C1-C4 are used to provide variable impedance, in other embodiments other impedance elements may be used, such as transmission lines, inductors, and/or resistors. Similarly, while the capacitors C1-C4 are switched between discrete states in order to adjust the impedance of tuning element 908, in other embodiments the impedance of tuning element 908 may be adjusted using continuously variable impedance elements. Also, while level shifters 910-916 are used to switch impedance elements, in other embodiments other devices such as transistors or comparators may be used to switch or adjust impedance elements.

Figure 10:
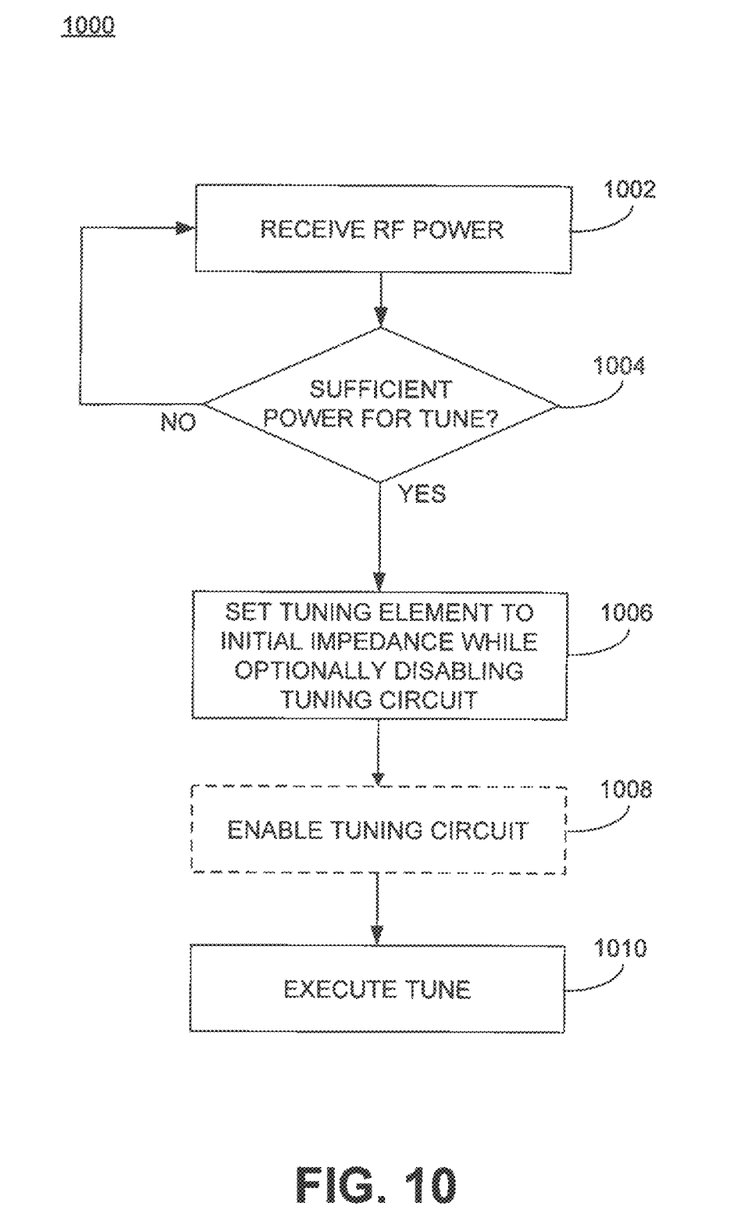
FIG. 10 is a flowchart depicting a process for setting an initial value for a tuning element before tuning impedance matching between an RFID IC and a tag antenna.

FIG. 10 is a flowchart depicting a process 1000 for setting an initial value for a tuning element before tuning impedance matching between an RFID IC and a tag antenna. Process 1000 begins at step 1002, where a tag may receive an RF wave and a tag rectifier may extract power from the received RF wave. At step 1004, one or more IC components, such as a tuning circuit (e.g., tuning circuit 620), a rectifier/PMU (e.g., rectifier/PMU 441), a controller or processing block, or some other IC component may determine whether the extracted power is sufficient for the tuning circuit to perform tuning. In some embodiments, the IC component(s) may determine whether the EPBT is at least equal to an SPTT. If not, the process moves back to step 1002.

If at step 1004 the IC component(s) determine that the extracted power is sufficient for tuning, at step 1006 the IC component(s) may switching a tuning element (e.g., tuning element 908) to an initial impedance value while optionally disabling the tuning circuit. In some embodiments, a particular voltage value may be required to switch the tuning element. Tuning circuit operation draws power and may reduce the voltage available for switching the tuning element. Accordingly, disabling the tuning circuit may prevent it from drawing power, thereby preventing reduction of the voltage available for tuning element switching. The tuning circuit may be disabled by opening a switch connecting the tuning circuit to a power supply such as the rectifier/PMU, thereby preventing the tuning circuit from powering up. In some embodiments, the tuning circuit may also be disabled by instructing the tuning circuit or a tuning circuit controller to refrain from powering up.

In some embodiments, the tuning element may be switched to the initial impedance value simply by providing a particular voltage (e.g., voltage 920 or VDD_SWITCH) to the tuning element or one or more components controlling the tuning element, such as level shifters (e.g., level shifters 910-916), switches (e.g., switches S1-S4), or tuning circuits (e.g., tuning circuit 620). In some embodiments, two or more voltages (e.g., voltage 920/VDD_SWITCH and voltage 930/RESET_B) may be provided to the tuning element or component(s) controlling the tuning element. In other embodiments, the tuning circuit, if not disabled, may be configured to switch the tuning element to the initial impedance value.

After the tuning element has been switched to the initial impedance value, at optional step 1008 the tuning circuit may be enabled if previously disabled at step 1006. In some embodiments, the tuning circuit may be enabled by closing a switch connecting the tuning circuit to a power supply such as the rectifier/PMU, allowing the tuning circuit to power up. The tuning circuit may also (or instead) be enabled by instructing the tuning circuit or a tuning circuit controller to power up. Subsequently, at step 1010 the tuning circuit may execute a tuning process by tuning the tuning element to increase the power extracted by the tag rectifier. In some embodiments, the tuning circuit may attempt to tune the tuning element such that the EPAT is at least equal to an SPOI.

Other mechanisms in addition to (or instead of) those described above may be used to conserve supply power and adjust tuning element impedance before the tuning process begins. In some embodiments, a switch may be used that prevents the tuning circuit from consuming power until a supply voltage has reached a certain point (e.g., at or above the voltage needed to switch the tuning element to its initial impedance). For example, the switch may be placed between the tuning circuit and the rectifier to prevent the tuning circuit from drawing power from the rectifier until the tuning element has been set to its initial impedance. This may reduce power consumption before the beginning of the tuning process. In another embodiment, the tuning circuit may be designed with significant hysteresis such that a relatively high voltage (e.g., at or higher than the voltage needed to switch the tuning element to its initial impedance) is required to initially turn the circuit on and a significantly lower voltage is sufficient to subsequently turn the circuit off. This may also allow the tuning element to be set to its initial impedance before appreciable power has been consumed by the tuning circuit. In yet other embodiments, switches in the tuning element (e.g., switches S1-S4) may be configured to turn on and/or off with zero gate voltage. In these embodiments, the tuning element may be set to its initial impedance even when power is being consumed by the tuning circuit. Such switches, known as "zero-gate-voltage switches", may be implemented with junction gate field-effect transistors (JFETs), floating gate p-type metal oxide semiconductor (PMOS) transistors with control gates and storing negative voltage, and/or floating gate n-type metal oxide semiconductor (NMOS) transistors with control gates and storing positive voltage.

The operations described in process 1000 are for illustrative purposes only. These operations may be implemented using additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) integrated circuit (IC) requiring a sufficient power to operate according to a protocol (SPOI), the IC comprising:
   a variable impedance;
   a tuning circuit configured to tune the variable impedance; and
   a rectifier coupled to the variable impedance and configured to extract a power from an RF wave; wherein
      during a first time period in which an extracted power before tuning (EPBT) is less than the SPOI but at least equal to a sufficient power to tune (SPTT), the IC is configured to:
         disable the tuning circuit; and
         tune the variable impedance to an initial impedance value; and during a second time period after the first time period, the IC is configured to:
  enable the tuning circuit; and
  cause the tuning circuit to tune the variable impedance such that an extracted power after tuning (EPAT) is at least equal to the SPOI.

2. The IC of claim 1, wherein the IC is further configured to:
  during the first time period, ignore a control signal for tuning the variable impedance; and
  during the second time period, use the control signal for tuning the variable impedance.

3. The IC of claim 1, wherein the IC is further configured to:
  during the first time period, use a voltage for tuning the variable impedance; and
  during the second time period, use another voltage different from the voltage for tuning the variable impedance.

4. The IC of claim 3, wherein:
  the rectifier comprises a plurality of serially-coupled rectifier stages;
  the voltage is provided from one of the rectifier stages; and
  the other voltage is provided from another one of the rectifier stages.

5. The IC of claim 1, wherein the initial impedance value is substantially in the center of a tuning range of the variable impedance.

6. The IC of claim 1, wherein:
  the IC is configured to tune the variable impedance to the initial impedance value using a zero-gate-voltage switch; and
  the zero-gate-voltage switch includes at least one of:
    a junction field-effect transistor (JFET); and
    a floating-gate transistor including a control gate.

7. The IC of claim 1, wherein the IC is configured to disable the tuning circuit by preventing the tuning circuit from drawing power from the rectifier.

8. A Radio Frequency Identification (RFID) tag comprising:
  an antenna; and
  an integrated circuit (IC) requiring a sufficient power to operate according to a protocol (SPOI), the IC comprising:
    a variable impedance coupled to the antenna;
    a rectifier coupled to the variable impedance and configured to extracted a power from an RF wave incident on the antenna; and
    a tuning circuit configured to tune the variable impedance, wherein:
      during a first time period in which an extracted power before tuning (EPBT) is less than the SPOI but at least equal to a sufficient power to tune (SPTT), the IC is configured to:
        disable the tuning circuit; and
        tune the variable impedance to an initial impedance value; and
      during a second time period after the first time period, the IC is configured to:
        enable the tuning circuit; and
        cause the tuning circuit to tune the variable impedance such that an extracted power after tuning (EPAT) is greater than the SPOI.

9. The tag of claim 8, wherein the IC is further configured to:
  during the first time period, ignore a control signal for tuning the variable impedance; and
  during the second time period, use the control signal for tuning the variable impedance.

10. The tag of claim 8, wherein the IC is further configured to:
  during the first time period, use a voltage to for tuning the variable impedance; and
  during the second time period, use another voltage different from the voltage for tuning the variable impedance.

11. The tag of claim 10, wherein:
  the rectifier comprises a plurality of serially-coupled rectifier stages;
  the voltage is provided from one of the rectifier stages; and
  the other voltage is provided from another one of the rectifier stages.

12. The tag of claim 8, wherein the initial impedance value is substantially in the center of a tuning range of the variable impedance.

13. The tag of claim 8, wherein:
  the IC is configured to tune the variable impedance to the initial impedance value by adjusting a zero-gate-voltage switch; and
  the zero-gate-voltage switch includes at least one of:
    a junction field-effect transistor (JFET); and
    a floating-gate transistor including a control gate.

14. The tag of claim 8, wherein the IC is further configured to disable the tuning circuit by preventing the tuning circuit from drawing power from the rectifier.

15. A method for a Radio Frequency Identification (RFID) tag integrated circuit (IC) requiring a sufficient power to operate according to a protocol (SPOI), the method comprising:
  rectifying an RF wave incident on an antenna port of the IC to extract a power;
  during a first time period in which an extracted power before tuning (EPBT) is less than the SPOI but at least equal to a sufficient power to tune (SPTT):
    disabling a tuning circuit; and
    tuning a variable impedance coupled to the antenna port to an initial impedance value; and
  during a second time period after the first time period:
    enabling the tuning circuit; and
    causing the tuning circuit to tune the variable impedance such that an extracted power after tuning (EPAT) is at least equal to the SPOI.

16. The method of claim 15, further comprising:
  during the first time period, ignoring a control signal for tuning the variable impedance; and
  during the second time period, using the control signal for tuning the variable impedance.

17. The method of claim 15, further comprising:
  during the first time period, using a voltage for tuning the variable impedance; and
  during the second time period, using another voltage different from the voltage to for tuning the variable impedance.

18. The method of claim 17, further comprising:
  providing the voltage from a first rectifier stage; and
  providing the other voltage from a second rectifier stage.

19. The method of claim 15, wherein the initial impedance value is substantially in the center of a tuning range of the variable impedance.

20. The method of claim 15, wherein tuning the variable impedance to the initial impedance value comprises adjusting a zero-gate-voltage switch.

21. The method of claim 15, wherein disabling the tuning circuit comprises preventing the tuning circuit from drawing power from the rectifier.

* * * * *